United States Patent
Letocart et al.

(10) Patent No.: US 10,240,051 B2
(45) Date of Patent: Mar. 26, 2019

(54) METHOD FOR PRODUCING A PANE HAVING AN ELECTRICALLY CONDUCTIVE COATING WITH ELECTRICALLY INSULATED DEFECTS

(71) Applicant: SAINT-GOBAIN GLASS FRANCE, Courbevoie (FR)

(72) Inventors: Philippe Letocart, Raeren (BE); Li-Ya Yeh, Geilenkirchen (DE); Michael Behmke, Duesseldorf (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 316 days.

(21) Appl. No.: 14/908,940

(22) PCT Filed: Jul. 15, 2014

(86) PCT No.: PCT/EP2014/065104
§ 371 (c)(1),
(2) Date: Jan. 29, 2016

(87) PCT Pub. No.: WO2015/032535
PCT Pub. Date: Mar. 12, 2015

(65) Prior Publication Data
US 2016/0168396 A1 Jun. 16, 2016

(30) Foreign Application Priority Data
Sep. 4, 2013 (EP) ..................... 13182931

(51) Int. Cl.
*C09D 5/24* (2006.01)
*G02F 1/15* (2006.01)
(Continued)

(52) U.S. Cl.
CPC .................. *C09D 5/24* (2013.01); *C03C 8/00* (2013.01); *C03C 17/09* (2013.01);
(Continued)

(58) Field of Classification Search
None
See application file for complete search history.

(56) References Cited

U.S. PATENT DOCUMENTS 5,151,807 A * 9/1992 Katayama ......... G02F 1/133345
349/144
5,343,216 A * 8/1994 Katayama ......... G02F 1/133345
345/92

(Continued)

FOREIGN PATENT DOCUMENTS

DE 102008026339 A1 12/2009
EP 0876608 B1 4/2002

(Continued)

OTHER PUBLICATIONS

Written Opinion for International Application No. PCT/EP2014/065104 filed Jul. 15, 2014 on behalf of Saint-Gobain Glass France. dated Oct. 6, 2014 (German original + English Translation) 11 pages.

(Continued)

*Primary Examiner* — John J Figueroa
(74) *Attorney, Agent, or Firm* — Steinfl + Bruno LLP

(57) ABSTRACT

A method for producing a pane having an electrically conductive coating is described. The method includes applying an electrically conductive coating onto a substrate, identifying defects of the coating, focusing the radiation of a laser having an annular beam profile on the coating, wherein the annular beam profile surrounds the defect, and producing an annular de-coated region by simultaneously removing the coating in the region of the beam profile.

21 Claims, 3 Drawing Sheets

Figure 1:
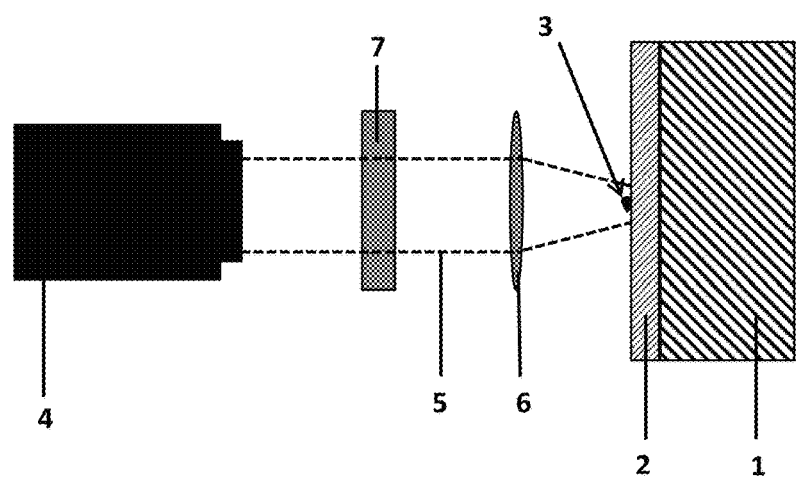

(51) Int. Cl.
*C03C 8/00* (2006.01)
*C03C 17/09* (2006.01)
*C03C 17/245* (2006.01)

(52) U.S. Cl.
CPC ............ *C03C 17/2453* (2013.01); *G02F 1/15* (2013.01); *C03C 2217/231* (2013.01); *C03C 2217/241* (2013.01); *C03C 2217/253* (2013.01); *C03C 2217/255* (2013.01); *C03C 2217/256* (2013.01); *C03C 2217/26* (2013.01); *C03C 2218/328* (2013.01)

(56) References Cited

U.S. PATENT DOCUMENTS

| | | | | |
|---|---|---|---|---|
| 5,518,956 | A | * | 5/1996 | Liu ........................ H01L 21/485 219/121.69 |
| 6,165,649 | A | | 12/2000 | Grenon et al. |
| 2002/0180926 | A1 | * | 12/2002 | Mizumura ........ G02F 1/136259 349/192 |
| 2004/0227462 | A1 | | 11/2004 | Utsumi et al. |
| 2006/0065645 | A1 | * | 3/2006 | Nakasu .................. B23K 26/34 219/121.68 |
| 2007/0227586 | A1 | | 10/2007 | Zapalac, Jr. |
| 2012/0026573 | A1 | | 2/2012 | Collins et al. |
| 2013/0320323 | A1 | | 12/2013 | Segawa et al. |
| 2015/0097944 | A1 | * | 4/2015 | Palm ...................... G01N 25/72 348/129 |

FOREIGN PATENT DOCUMENTS

| | | |
|---|---|---|
| JP | 2007-273933 A | 10/2007 |
| KR | 1019990085563 A | 12/1999 |
| WO | 2004107268 A1 | 9/2004 |
| WO | 2010112789 A2 | 10/2010 |
| WO | 2011033313 A1 | 3/2011 |
| WO | 2012007334 A1 | 1/2012 |
| WO | 2012154320 A1 | 11/2012 |
| WO | 2012/172612 A1 | 12/2012 |

OTHER PUBLICATIONS

Watanabe, T. et al. "Generation of a doughnut-shaped beam using a spiral phase plate" Review of Scientific Instruments; Dec. 2004; vol. 75; No. 12; pp. 5131-5135.

International Search Report for International Application PCT/EP2014/065104 filed Jul. 15, 2014 on behalf of Saint-Gobain Glass France. dated Oct. 6, 2014 (English translation with German original).

* cited by examiner

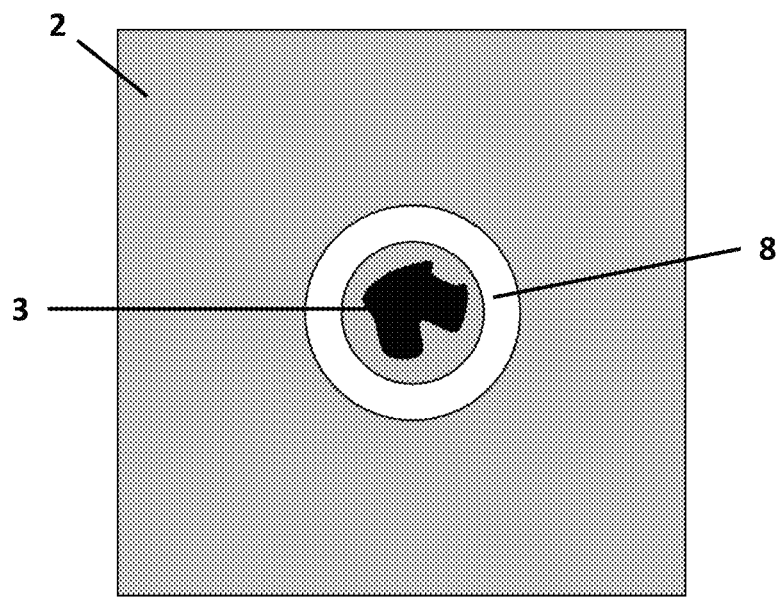
Fig. 3
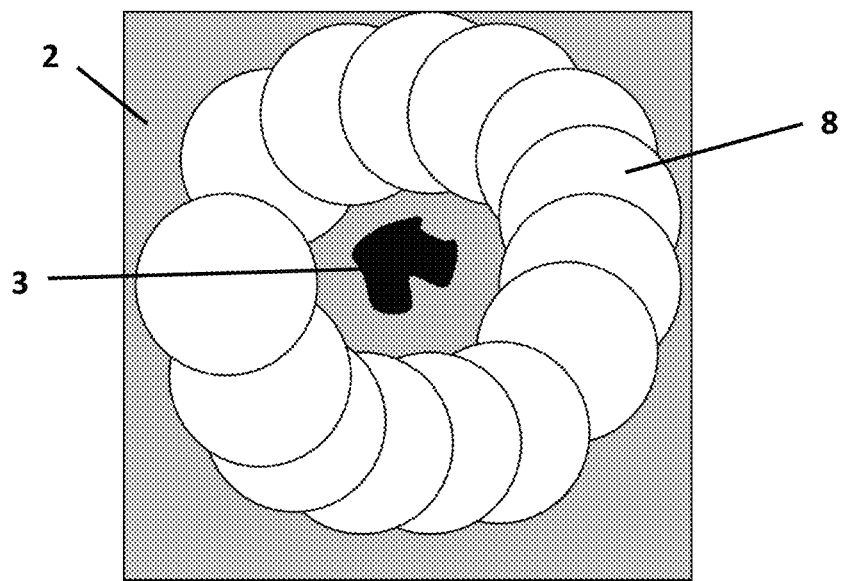
Fig. 4 – Prior Art

METHOD FOR PRODUCING A PANE HAVING AN ELECTRICALLY CONDUCTIVE COATING WITH ELECTRICALLY INSULATED DEFECTS

CROSS REFERENCE TO RELATED APPLICATIONS

The present application is the U.S. national stage entry of International Patent Application No. PCT/EP2014/065104, filed internationally on Jul. 15, 2014, which, in turn, claims priority to European Patent Application No. 13182931.9, filed on Sep. 4, 2013.

The invention relates to a method for producing a pane with an electrically conductive coating, a pane produced with the method, as well as its use.

Glazings with switchable or controllable optical properties are a type of modern, active glazings. With such glazings, the transmittance of light can, for example, be actively influenced as a function of applied electrical voltage. The user can, for example, switch from a transparent to a nontransparent state of the glazing in order to prevent seeing into a room from outside. With other glazings, the transmittance can be continuously controlled, for example, to regulate the entry of solar energy in a room.

The known switchable or controllable glazings are based on different technical principles. Electrochromic glazings are, for example, known from US 20120026573 A1 and WO 2012007334 A1, PDLC (polymer dispersed liquid crystal) glazings from DE 102008026339 A1, and SPD (suspended particle device) glazings from EP 0876608 B1 and WO 2011033313 A1. Even with OLED (organic light emitting diode) glazings, the optical properties, in this case, the emission of light, can be electrically controlled. OLEDs are known, for example, from US 2004227462 A1 and WO 2010112789 A2.

The glazings are usually implemented as laminated glass. The active layer that has the switchable properties is arranged between two surface electrodes between the two panes of the laminated glass The plate electrodes are connected to an external voltage source by means of which the voltage applied to the active layer can be controlled. The plate electrodes are usually thin films of electrically conductive material, frequently indium tin oxide (ITO). Frequently, at least one of the plate electrodes is applied directly on the surface of one of the individual panes of the laminated glass, for example, by cathodic sputtering. The coating can have production-related defects, in particular defects as a result of small metallic particles. These particles can lead to problems during operation of the switchable glazing. In particular, short-circuits that result in local malfunctions can occur.

Consequently, it is reasonable and customary to remedy such defects of the electrically conductive layers. Methods of laser processing are particularly suitable for this due to their high resolution capability. It is thus possible to remove deposited metal particles by direct laser radiation. However, fragments of the particle can redeposit on the coating such that new defects occur. An alternative approach is the electrical isolation of the defect from the surrounding coating such that during the operation of the glazing, the flow of current through the defect is prevented.

It is common, for isolation of the defect, to generate a de-coated region around the defect by removal of the coating using laser ablation. For this, laser radiation with the conventional, roughly Gaussian beam profile, which is moved around the defect to generate the de-coated region, Is used.

A method for identification and isolation of defects is known, for example, from WO2012154320A1. Short-circuits and local malfunctions can be effectively prevented by such isolation. However, the de-coated regions around the defects are frequently so extensive that they are perceptible with the naked eye, which adversely affects the aesthetics of the glazing. Moreover, the movement of the laser beam around the defect requires a complex laser scanning mechanism with numerous moving parts, which renders the method time-consuming and failure prone.

The object of the present invention is to provide an improved method for producing a pane with an electrically conductive coating. Compared to the prior art, defects should be isolated in a less conspicuous manner and the method should be less time-consuming and failure prone.

The object of the present invention is accomplished according to the invention by a method for producing a pane with an electrically conductive coating according to claim 1. Preferred embodiments emerge from the subclaims.

The method according to the invention for producing a pane with an electrically conductive coating comprises at least the following process steps:
  applying an electrically conductive coating on a substrate,
  identifying defects of the coating,
  focusing the radiation of a laser with an annular beam profile on the coating, wherein the annular beam profile surrounds the defect, and
  producing an annular de-coated region, by simultaneously removing the coating in the region of the beam profile.

The object of the invention is further accomplished according to the invention by a pane with an electrically conductive coating, comprising at least a substrate with an electrically conductive coating, wherein the electrically conductive coating has at least one defect that is isolated from the surrounding coating with an annular beam profile by means of the radiation of a laser.

Laser radiation with an annular beam profile is also known to the person skilled in the art under other names, for example: torus-shaped intensity distribution, circular mode, doughnut mode, or Laguerre-Gaussian mode. The intensity distribution is distributed in an annular shape in the focal plane, with no radiation density present in the center of the ring. According to the invention, the radiation is focused on the coating such that the defect to be isolated is arranged completely within this center of the ring, is itself thus not struck by the laser radiation. The annular beam profile surrounds the defect. This means that an annular region around the defect is impinged upon with radiation of significant intensity, with the coating being removed (laser ablation) and an annular de-coated (or coating free) region being generated around the defect. The de-coated region isolates the defect electrically from the surrounding conductive coating which carries current during use of the coated pane. Thus, current cannot flow through the defect; as a result, undesirable malfunctions such as short-circuits, hotspots, or the like are avoided.

The coating in the region of the beam profile is simultaneously removed by the laser radiation. "Simultaneously" means that the entire de-coated region is created at the same time. The de-coated region is thus not generated successively by movement of the laser radiation around the defect, with subregions that ultimately yield the annular de-coated region being removed in succession.

In contrast to moving a simple laser beam around the defect to isolate it, the method according to the invention has several advantages. The laser beam does not have to be moved for the laser ablation, which renders expensive and potentially failure prone scanning devices superfluous and shortens the time necessary for processing. In addition, the isolating de-coated region has a significantly smaller line width and expanse such that it is less readily noticeable to the observer, which benefits the aesthetics of the resulting glazing.

The annular beam profile can, in principle, be generated in any manner familiar to the person skilled in the art. The beam profile can, for example, be generated by a phase optical element within the laser resonator, in particular as a transverse mode $TEM_{01^*}$. The radiation then already has the annular radiation profile upon leaving the laser resonator. It is, however, technically simpler and, consequently, preferable to convert conventional laser radiation with an approximately Gaussian radiation profile, in particular the transverse mode $TEM_{00}$, only after leaving the laser resonator into the radiation with an annular beam profile.

This conversion can, for example, be done with a so-called axicon and a lens arranged behind it in the beam path.

The annular beam profile is generated, in a particularly advantageous embodiment, by a phase plate from the approximately Gaussian beam profile. This is particularly advantageous with regard to the simplicity of the optical assembly.

The phase plate is, in a preferred embodiment, a spiral phase plate. Such a phase plate and the generation of the annular beam profile is described, for example, in Watanabe et al.: "Generation of a doughnut-shaped beam using a spiral phase plate". Rev. Sci. Instrum. 75 (2004) 5131.

The phase plate is, in another preferred embodiment, a segmented phase plate. This consists of a plurality, for example, four birefringent λ/2-platelets in different angular positions. The individual segments ensure that opposing beamlets have a phase shift relative to each other such that upon focusing in the center of the beam profile, destructive interference of the beamlets is obtained.

The electrically conductive coating is applied, in a preferred embodiment, by physical vapor deposition (PVD) on the substrate. Particularly preferably, the method of cathodic sputtering, in particular magnetically enhanced cathodic sputtering (magnetron sputtering), is used. By this means, electrically conductive coatings can be generated in high electrical and optical quality quickly, economically, and, if need be, even with large areas.

The defects are, in particular, undesirable electrically conductive particles, in particular metallic or crystalline particles, in the electrically conductive coating. The particles can be embedded in the coating or are arranged on or under the coating. Such particles can, for example, be detached from the target at the time of a PVD process and put down on the substrate. The metallic particles customarily have sizes from 1 µm to 1 mm, in particular from 10 µm to 500 µm, and, especially, from 25 µm to 150 µm. In principle, however, the method according to the invention is also suitable for other types of defects which should be isolated from the surrounding coating in order not to be subjected to the flow of electrical current during operation of the pane.

The identification of the defects is done using methods known per se, for example, optical imaging methods, microscopic methods, or thermographic methods. The identification includes sufficiently precise positional determination of the defect in order to subsequently aim the laser radiation at the defect.

After performance of the method according to the invention, the defect is surrounded by an annular, coating-free (or de-coated) region. Since this region was generated by laser ablation with an annular radiation profile, the line width is constant. The line width of the de-coated region is, in an advantageous embodiment, from 5 µm to 100 µm, preferably from 15 µm to 50 µm.

The diameter of the annular radiation profile is preferably selected such that it is adapted to the size of the defect. The diameter should be as small as possible so that the de-coated region is as inconspicuous as possible but large enough to reliably isolate the defect from the current carrying coating. The diameter can, for example, be influenced by the phase plate for the generation of the beam profile. The diameter of the de-coated region is, in particular, preferably smaller than 1 mm, particularly preferably smaller than 0.25 mm.

The laser radiation is focused on the electrically conductive coating by means of a focusing element.

The line width B of the annular coating-free region can be influenced, in particular, by the wavelength λ of the laser radiation, the focal length f of the focusing element, and the diameter d of the collimated beam impinging on the focusing element. The line width B is, moreover, a function of the phase plate for generating the annular beam profile, if such is used.

The wavelength of the laser radiation is preferably from 200 nm to 2500 nm. In this wavelength range, good results are obtained in the isolation of defects with the process according to the invention. The wavelength is particularly preferably from 300 nm to 1500 nm. In this wavelength range, due to the commercial availability of suitable lasers, the method is particularly economical to perform. It has been demonstrated that particularly good results are obtained in the wavelength range from 325 nm to 600 nm.

The invention is not restricted to a specific type of lasers. Instead, the person skilled in the art can select the laser as a function of the conditions in the individual case. In a preferred embodiment, a solid-state laser is used as the laser, for example, an Nd:Cr:YAG-laser, an Nd:Ce:YAG-laser, a Yb:YAG-laser, particularly preferably an Nd:YAG-laser. The radiation of the laser can be frequency doubled once or multiple times to generate the desired wavelength. However, other lasers can also be used, for example, fiber lasers, semiconductor lasers, excimer lasers, or gas lasers.

The focal length of the focusing element determines the spread of the focus of the laser radiation. The focal length of the focusing element is preferably from 10 mm to 500 mm, particularly preferably from 50 mm to 200 mm, most particularly preferably from 60 mm to 100 mm. Particularly good results are obtained with this. A smaller focal length of the optical element requires too small a working distance between the electrically conductive coating and the optical element. A larger focal length results in too great a spread of the laser focus, by means of which the line width of the de-coated region becomes undesirably large and the isolated defect becomes disturbingly conspicuous for an observer.

The laser is preferably operated in pulsed mode. This is particularly advantageous with regard to a high power density and effective generation of the de-coated region according to the invention. The pulse frequency is preferably from 1 kHz to 200 kHz, particularly preferably from 10 kHz to 100 kHz, for example, from 30 kHz to 60 kHz. The pulse length is preferably from 1 ps to 1000 ns, particularly preferably from 1 ns to 100 ns. This is particularly advantageous with regard to the power density of the radiation during de-coating.

The power density in the focus of the laser radiation is preferably from 0.01 to 100 $10^8$ W/cm$^2$, particularly preferably from 1 to 10 $10^8$ W/cm$^2$. With this, particularly good results are obtained with regard to de-coating.

It has been demonstrated that, with suitable adjustment of the processing parameters, in particular within the context of the preferred ranges, the de-coated region is already generated after the striking of one or a few laser pulses, i.e., the coating is thus removed in an annular shape. The method thus enables a very short radiation period and processing time. The radiation period is preferably less than 0.5 s, particularly preferably less than 0.1 s, and most particularly preferably less than 0.05 s.

In order to aim the laser radiation at the defect, in an advantageous embodiment, the substrate is stationary. The positioning is done by a movement of the focusing element and of the laser or by a movement of the focusing element and an optical waveguide. The elements to be moved are, for this purpose, preferably arranged on a cross table (XY table).

Alternatively, the relative movement of radiation and substrate can, of course, also be done by movement of the laser beam using an optical scanning device or by movement of the substrate with stationary laser radiation. Combinations of the alternatives described here are, in principle, also conceivable.

The radiation of the laser can be guided between the laser and the focusing optical element by at least one optical waveguide, for example, a glass fiber. Other optical elements, for example, collimators, diaphragms, filters, or elements for frequency doubling, can also be arranged in the beam path of the laser.

The electrically conductive coating is, in particular, a thin film or a stack of thin films.

The electrically conductive coating is, in a preferred embodiment, a heatable coating. Such a coating is provided for the purpose of being electrically contacted by busbars between which an electrical current flows through the coating. The busbars are usually implemented as strips of a metallic foil, for example, tinned copper foil or as printed and fired paste, in particular screen printing paste with silver particles and glass frits. The heating effect is obtained through the development of Joule heat as a result of the electrical resistance of the coating. In particular, through the isolation of defects according to the invention, the homogeneity of the heat output can be improved and the occurrence of so-called hotspots can be prevented.

The electrically conductive coating is, in another preferred embodiment, a plate electrode of a glazing with electrically heatable or controllable optical properties. Among these glazings, which are known per se to the person skilled in the art, are, in particular, electrochromic glazings, PDLC glazings (polymer dispersed liquid crystal), SPD glazings (suspended particle device), and electroluminescent glazings such as, for example, OLEDs. Such glazings include an active layer with the switchable or controllable optical properties, which is arranged between two plate electrodes. Through the plate electrodes, a voltage can be applied to the active layer, by which means the optical properties are adjustable. The electrical contacting of the plate electrodes is customarily done via busbars. By means of the isolation of defects of the plate electrode according to the invention, short-circuits, which would otherwise result in local malfunctions, can be avoided in such glazings.

However, the invention is, in principle, not limited to the aforementioned types of electrically conductive coatings. Rather, the method according to the invention can, in principle, be used on any electrically conductive coating in which the electrical isolation of defects is desirable or necessary.

The electrically conductive coating preferably contains at least silver, gold, copper, tungsten, graphite, molybdenum, or a transparent conductive oxide (TCO), for example, indium tin oxide (ITO) or fluorine-doped tin oxide ($SnO_2$:F). Coatings containing silver as transparent heatable coatings and coatings containing TCO as transparent plate electrodes are particularly widespread.

The electrically conductive coating preferably has a thickness less than or equal to 5 µm, particularly preferably less than or equal to 2 µm, more particularly preferably less than or equal to 1 µm, and especially less than or equal to 500 nm. The method according to the invention can be used particularly effectively on coatings with such thicknesses. The thickness of the coating is, of course, governed in the individual case by the material used and the intended use of the coating and is, for example, from 5 nm to 2 µm or from 10 nm to 1 µm. Thicknesses from 30 nm to 500 nm, preferably 50 nm to 200 nm are, in particular, customary for plate electrodes.

The substrate preferably contains at least glass, for example, quartz glass, borosilicate glass, or soda lime glass, particularly preferably soda lime glass, or at least one polymer, in particular a transparent polymer, particularly preferably polycarbonate (PC) or polymethyl methacrylate (PMMA). The thickness of the substrate is governed by the use in the individual case and is customarily from 0.5 mm to 15 mm, in particular from 1 mm to 5 mm. The substrate can be clear and transparent or also tinted or colored. The substrate can be flat but also slightly or greatly curved in one or a plurality of spatial directions.

The pane according to the invention with an electrically conductive coating or the pane produced according to the invention is preferably used as a heatable pane, in particular a window pane of a building or of a motor vehicle, wherein the electrically conductive layer is a heating layer. The pane according to the invention or the pane produced according to the invention is, alternatively, preferably used as a component of a glazing with electrically switchable or controllable optical properties, wherein the electrically conductive coating is preferably a plate electrode. The glazing with electrically switchable or controllable optical properties is, in this case, preferably an electrochromic glazing, PDLC glazing, SPD glazing, or electroluminescent glazing, in particular OLED.

The invention further comprises the use of laser radiation with an annular radiation profile for isolating defects of an electrically conductive coating on a substrate by laser ablation.

In the following, the invention is explained in detail with reference to drawings and exemplary embodiments. The drawings are a schematic representation and not true to scale. The drawings in no way restrict the invention.

Figure 2:
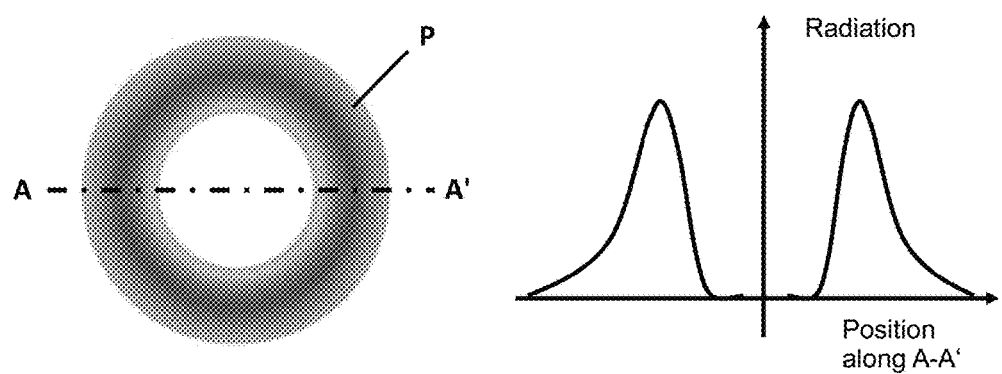
Figure 5:
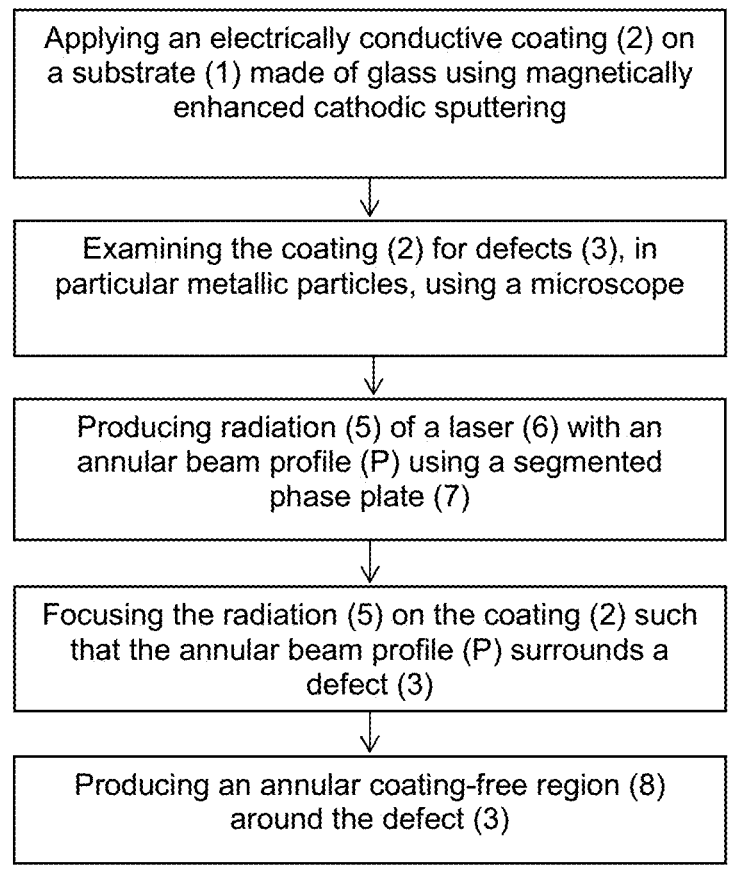

They depict:

FIG. 1 an arrangement for performing the method according to the invention,

FIG. 2 a schematic representation of the annular beam profile of the laser radiation, FIG. 3 a plan view of one embodiment of the pane according to the invention, FIG. 4 a plan view of a pane produced according to the prior art, and FIG. 5 a flowchart of one embodiment of the method according to the invention.

FIG. 1 schematically depicts a coated pane during performance of one embodiment of the method according to the invention. The pane includes a substrate 1 made of soda lime glass with a thickness of, for example, 2.1 mm and an electrically conductive coating 2 made of ITO with a thickness of roughly 100 nm. The pane is provided as a component of an electrochromic glazing, wherein the coating 2 is intended to serve as a transparent plate electrode.

The coating 2 has a defect 3. The defect 3 is a metal particle with a size of roughly 50 µm, which was incorporated into the coating 2 during application of the coating 2 on the substrate 1 by magnetron sputtering. If current flows through this defect 3 in the electrochromic glazing, it can lead to short-circuits, which result in local malfunctions of the glazing.

The method according to the invention consequently provides for electrically isolating the defect 3 from the surrounding coating 2, which carries current during use. To this end, a de-coated region is to be produced around the defect 3. This de-coating is done according to the invention by laser ablation with laser radiation having an annular radiation profile.

The annular radiation profile is produced from the Gaussian radiation profile of a laser 4. The laser 4 is, for example, a frequency-doubled Nd:YAG-laser. The wavelength of the laser radiation 5 is, for example, 532 nm. The laser radiation 5 passes through a phase plate 7 (spiral phase plate) and is focused on the coating 2 by an f-theta lens 6 with a focal length of, for example, 80 mm. As a result of the phase plate 7, opposing beamlets have a phase shift and, during focusing, destructive interference occurs in the center of the beam profile. As a result, a focus with an annular radiation profile is generated in the plane of the coating 2. The radiation 5 is aimed at the coating 2 such that the defect 3 is surrounded by the annular radiation profile. For this, the laser 4, the phase plate 7, and the lens 6 are mounted on an XY table (not shown).

The laser radiation 5 has, for example, a pulse length of 10 ns and a pulse sequence frequency of 20 kHz. The power density in the focus is, for example, $2*10^8$ W/cm$^2$. Already after one or a few pulses, the desired isolating region around the defect is created by laser ablation.

FIG. 2 schematically illustrates the annular radiation profile P of the laser radiation 5 according to the invention. The left part of the figure depicts a plan view of the focus of the radiation 5. The right part of the figure depicts the radiation intensity along the cross-section A-A through the center of the annular profile P. The focus has no radiation intensity in the center. In the method according to the invention, the defect is positioned in this center and the surrounding coating is removed by the annular radiation 5.

FIG. 3 depicts a plan view of a pane according to the invention in the region of a defect 3 after performance of the method according to the invention. The electrically conductive coating 2 has an annular, de-coated region 8. The region 8 isolates the defect 3 from the surrounding coating 2. The defect 3 is a metal particle with a size of roughly 50 µm. The annular region 8 has, for example, an average diameter of roughly 100 µm and a line width of 20 µm. The de-coated region 8 is, due to its small size, hardly perceptible by an observer and, consequently, does not negatively affect the aesthetics of the pane.

FIG. 4 depicts, for comparison, a plan view of a coated pane with an isolated defect according to the prior art. The pane also has a de-coated region 8 around the defect 3, which was, however, produced by movement of a laser beam with the customary Gaussian radiation profile around the defect. Because of the necessary movement of the laser radiation, a complex technical assembly with a large number of movable and, consequently, potentially failure-prone parts is required. The de-coating procedure is also more time-consuming than according to the method of the invention. The significantly larger dimensions of the region 8, which is, consequently, significantly more conspicuous for the observer, are a further disadvantage. This results from the size of the laser focus. The de-coated region that was generated with the conventional method customarily has a width of roughly 30 µm to 100 µm, and is thus significantly larger than the line width that can be achieved with the annular radiation profile according to the invention with otherwise comparable experimental parameters. As a result, the total size of the de-coated region 8 is also significantly larger.

FIG. 5 depicts a flowchart of one exemplary embodiment of the method according to the invention for producing a pane with an electrically conductive coating.

EXAMPLE

Ten test panes were produced in accordance with the method according to the invention corresponding to the exemplary embodiment presented in FIG. 1. The panes were then used in electrochromic glazings, wherein the coating 2 functioned as a plate electrode after electrical contact. The electrochromic glazings were presented in operation to a group of observers who were to evaluate the glazings according to optical criteria. In particular, the presence of local malfunctions of the electrochromic glazings and the visibility of isolated defects (or of the de-coated regions 8) within of the coating 2 were to be evaluated. The representative observations are summarized in Table 1.

Comparative Example 1

Ten panes were produced according to the prior art. The isolation of the defects 3 was done not by laser radiation with an annular radiation intensity, but rather by movement of radiation with Gaussian radiation intensity around the defect. The glazings were likewise used in electrochromic glazings and evaluated according to the same criteria as in the Example. The observations are summarized in Table 1.

Comparative Example 2

Ten panes were provided with the electrically conductive coating 2 and used in electrochromic glazings, without defects 3 having been identified and isolated in advance. The glazings were evaluated according to the same criteria as in the Example. The observations are summarized in Table 1.

TABLE 1

|  | Local malfunctions of the switchable glazing | Visibility of isolated defects 3 |
|---|---|---|
| Comparative Example 2 | present | (none) |
| Comparative Example 1 | not present | significant |
| Example | not present | reduced |

By means of the method according to the invention, local malfunctions, which are, in particular, to be attributed to short-circuits on defects of the electrically conductive coating, are effectively avoided. This is done through isolation of the defects by laser ablation, wherein laser radiation with an annular radiation profile according to the invention was used. The de-coated regions around the defects are significantly more difficult to detect in the panes according to the invention. Moreover, the method according to the invention is significantly less time-intensive and the technical assembly is less prone to failure. These results were unexpected and surprising for the person skilled in the art.

LIST OF REFERENCE CHARACTERS (1) substrate
(2) electrically conductive coating
(3) defect of the coating 2
(4) laser
(5) radiation of the laser 4
(6) focusing element
(7) phase plate
(8) de-coated region
(P) annular beam profile

The invention claimed is:

1. A method for producing a pane having an electrically conductive coating, comprising:
   applying an electrically conductive coating on a substrate;
   identifying a defect of the electrically conductive coating;
   focusing radiation from a laser with an annular beam profile on the electrically conductive coating, wherein the annular beam profile surrounds the defect; and
   producing an annular de-coated region by simultaneously removing the electrically conductive coating in the region of the beam profile.

2. The method according to claim 1, wherein the electrically conductive coating is applied by physical vapor deposition on the substrate.

3. The method according to claim 1, wherein the electrically conductive coating is applied by cathodic sputtering.

4. The method according to claim 1, wherein the electrically conductive coating is applied by magnetically enhanced cathodic sputtering.

5. The method according to claim 1, wherein the defects are conductive particles in the electrically conductive coating.

6. The method according to claim 5, wherein the conductive particles have a size of one μm to one mm.

7. The method according to claim 1, wherein the defects are metallic or crystalline particles in the electrically conductive coating, and wherein the metallic or crystalline particles have a size of one μm to one mm.

8. The method according to claim 1, wherein the wavelength of the radiation is from 200 nm to 2500 nm.

9. The method according to claim 1, wherein the annular beam profile is generated by a phase plate.

10. The method according to claim 1, wherein the annular beam profile is generated by a spiral phase plate or a segmented phase plate.

11. The method according to claim 1, wherein the laser is operated in pulsed mode, a pulse length of the radiation is from 1 ps to 1000 ns, and a pulse sequence frequency is from 1 kHz to 200 kHz.

12. The method according to claim 1, wherein a power density of the radiation on the electrically conductive coating is from 0.01 to 100 $10^8$ W/cm$^2$.

13. The method according to claim 1, wherein the radiation is focused on the electrically conductive coating using a focusing element having a focal length of 10 mm to 500 mm.

14. The method according to claim 1, wherein the electrically conductive coating contains silver or a transparent, electrically conductive oxide.

15. The method according to claim 1, wherein the electrically conductive coating has a thickness of less than or equal to 5 μm.

16. The method according to claim 1, wherein the substrate contains glass or a transparent polymer.

17. A glass pane having an electrically conductive coating, comprising:
    a glass pane;
    an electrically conductive coating on the glass pane; and
    a defect in the electrically conductive coating,
        wherein the defect is isolated from the surrounding coating using radiation from a laser having an annular beam profile.

18. The glass pane according to claim 17, wherein the defect is surrounded by an annular, de-coated region with a constant line width.

19. The glass pane according to claim 18, wherein the line width of the de-coated region is from 5 μm to 100 μm.

20. A method of using a glass pane having an electrically conductive coating, comprising:
    providing a glass pane having an electrically conductive coating with a defect, wherein the defect is isolated from the surrounding coating using radiation from a laser having an annular beam profile; and
    using the glass pane having an electrically conductive coating as a heatable window glass pane of a building or of a motor vehicle, or as a component of a glazing with electrically switchable or controllable optical properties.

21. A pane having an electrically conductive coating, comprising:
    a substrate containing at least one polymer;
    an electrically conductive coating on the substrate; and
    a defect in the electrically conductive coating,
        wherein the defect is isolated from the surrounding coating using radiation from a laser having an annular beam profile.

* * * * *